United States Patent
Khurana et al.

(10) Patent No.: US 8,058,902 B1
(45) Date of Patent: Nov. 15, 2011

(54) CIRCUIT FOR ALIGNING INPUT SIGNALS

(75) Inventors: Sahil Khurana, Kamal (IN); Vivek Singhal, Bangalore (IN); Yogesh Darwhekar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/813,527

(22) Filed: Jun. 11, 2010

(51) Int. Cl.
  *G06F 7/38* (2006.01)
  *G06F 1/12* (2006.01)
  *G06F 13/42* (2006.01)
  *H03K 19/0175* (2006.01)
  *H01L 5/00* (2006.01)
  *H01L 7/00* (2006.01)

(52) U.S. Cl. .............................. 326/46; 326/82; 713/400

(58) Field of Classification Search .................... 326/46, 326/82, 83, 86, 87; 327/201–218; 713/375, 713/400, 500, 501
See application file for complete search history.

(56) References Cited

U.S. PATENT DOCUMENTS

| | | | | |
|---|---|---|---|---|
| 5,926,053 | A  * | 7/1999 | McDermott et al. | 327/298 |
| 6,404,248 | B1 * | 6/2002 | Yoneda | 327/158 |
| 6,507,230 | B1 * | 1/2003 | Milton | 327/291 |
| 6,509,762 | B1 * | 1/2003 | Moss et al. | 327/12 |
| 7,157,948 | B2 * | 1/2007 | McClannahan et al. | 327/151 |
| 2001/0021953 | A1* | 9/2001 | Nakashima | 710/5 |
| 2008/0187080 | A1* | 8/2008 | Lee et al. | 375/355 |

* cited by examiner

*Primary Examiner* — Shawki S Ismail
*Assistant Examiner* — Dylan White
(74) *Attorney, Agent, or Firm* — Ronald O. Neerings; Wade James Brady, III; Frederick J. Telecky, Jr.

(57) ABSTRACT

A circuit for aligning input signals includes a clock generating circuit (CGC) responsive to first signal and second signal to generate a clock signal. A first flip flop and a second flip flop, coupled to the CGC, are responsive to first type of edge of the clock signal to output the first signal and the second signal. A finite state machine (FSM), coupled to the CGC, the first flip flop and the second flip flop, is responsive to second type of edge of the clock signal to detect early arrival of one of the first signal and the second signal with respect to each other, and to generate first control signal and second control signal. A first programmable delay element and a second programmable delay element, coupled to the FSM, delays first input signal based on the first control signal and second input signal based on the second control signal.

19 Claims, 5 Drawing Sheets

US 8,058,902 B1

CIRCUIT FOR ALIGNING INPUT SIGNALS

TECHNICAL FIELD

Embodiments of the disclosure relate to a circuit for aligning input signals.

BACKGROUND

Often, during manufacturing and testing of integrated chips manual efforts are required to encounter challenges of meeting certain constraints, for example timing requirements. Existing techniques employ low cost testers to test the timing requirements of the integrated chips. However, while sending input signals to a device under test (DUT) the input signals can be misaligned with respect to each other. The misalignment of the input signals can be due to interface uncertainties. Further, board parasitics and package parasitics can also cause additional interface uncertainties. Such interface uncertainties need to be considered while designing which in turn makes designing a time consuming, complex, and cumbersome process.

In an existing technique, the interface uncertainties can be minimized by adding a finite delay to each input signal of the input signals. However, calculation of the finite delay can be inaccurate due to manual intervention. Further, manual efforts involved in calculation of the finite delay increases with increase in number of the input signals leading to time inefficiency and increased inaccuracy.

SUMMARY

An example of a circuit for aligning input signals includes a clock generating circuit that is responsive to a first signal and a second signal to generate a clock signal. The first signal is associated with a first input signal of the input signals and the second signal is associated with a second input signal of the input signals. The circuit also includes a first flip flop coupled to the clock generating circuit. The first flip flop is responsive to a first type of edge of the clock signal to output the first signal. The circuit further includes a second flip flop coupled to the clock generating circuit. The second flip flop is responsive to the first type of edge of the clock signal to output the second signal. Further, the circuit includes a finite state machine (FSM) that is coupled to the clock generating circuit, the first flip flop and the second flip flop. The FSM is responsive to a second type of edge of the clock signal to detect early arrival of one of the first signal and the second signal with respect to each other. The FSM also generates a first control signal that is indicative of delay to be added to the first input signal if early arrival of the first signal is detected, and a second control signal that is indicative of delay to be added to the second input signal if early arrival of the second signal is detected. Moreover, the circuit includes a first programmable delay element and a second programmable delay element. The first programmable delay element is coupled to the FSM to delay the first input signal based on the first control signal if early arrival of the first signal is detected. The second programmable delay element is coupled to the FSM to delay the second input signal based on the second control signal if early arrival of the second signal is detected.

An example of a circuit includes a clock generating circuit to generate a clock signal based on a plurality of signals. The circuit also includes a plurality of flip flops coupled to the clock generating circuit to output the plurality of signals at a first type of edge of the clock signal. One flip flop of the plurality of flip flops corresponds to one signal of the plurality of signals. The circuit further includes a finite state machine (FSM) coupled to the clock generating circuit and the plurality of flip flops. The FSM is responsive to a second type of edge of the clock signal to detect at least one early arriving signal from the plurality of signals and to generate a control signal based on detection. Further, the circuit includes a plurality of programmable delay elements coupled to the FSM. At least one programmable delay element of the plurality of programmable delay elements is responsive to the control signal to delay at least one input signal associated with the at least one early arriving signal. One programmable delay element corresponds to one signal of the plurality of signals and the at least one programmable delay element corresponds to the at least one early arriving signal.

An example of a method includes detecting early arrival of at least one signal from a plurality of signals in response to a desired type of edge of a clock signal. The method also includes generating a control signal in response to detection of early arrival of the at least one signal. The method further includes delaying at least one input signal associated with the at least one signal based on the control signal. Moreover, the method includes outputting the plurality of signals if at least one of alignment of the plurality of signals and delaying of each input signal associated with each signal of the plurality of signals is detected.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

Figure 1:
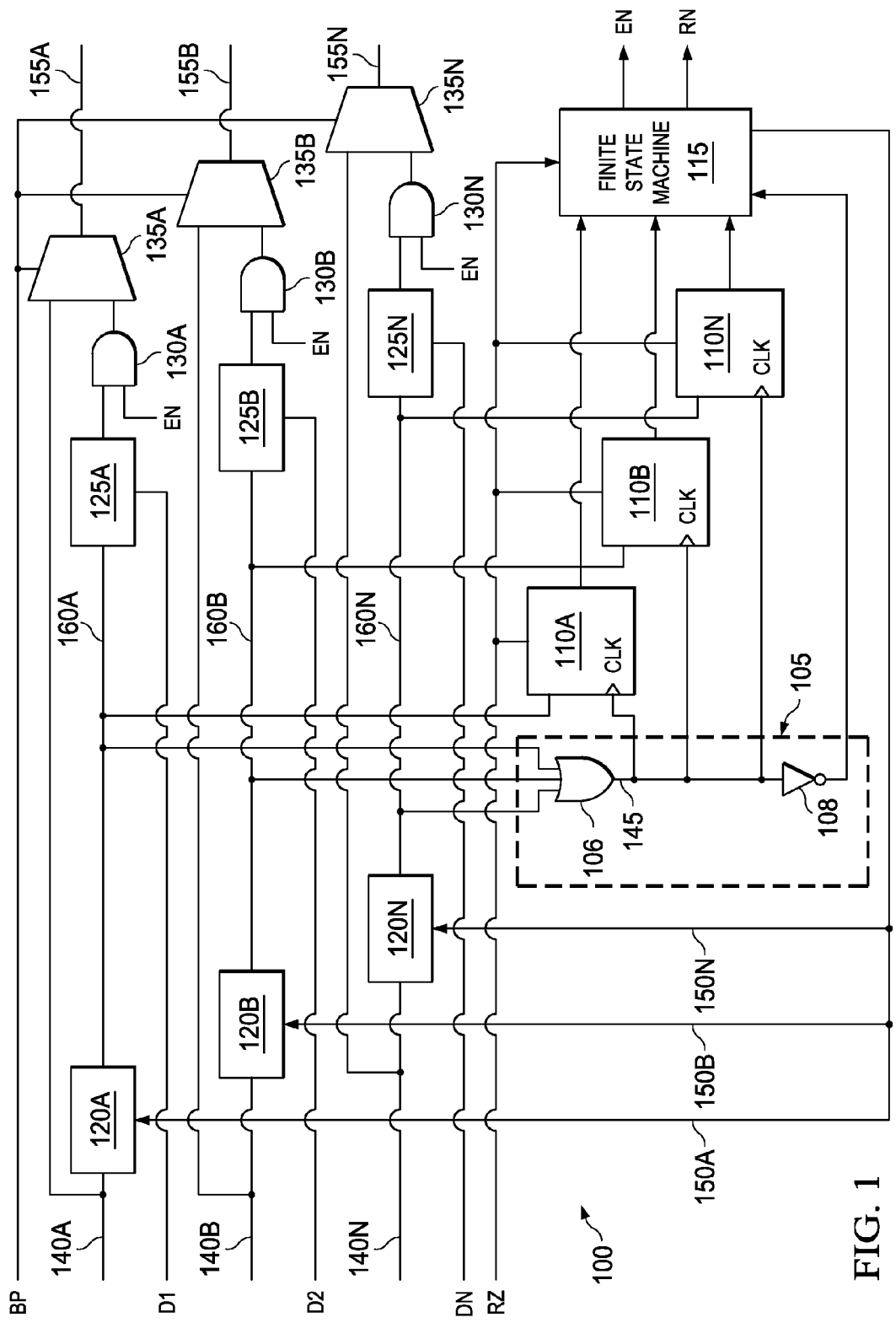
FIG. 1 illustrates a circuit for aligning input signals, in accordance with one embodiment.

FIG. 1 illustrates a circuit 100 for aligning input signals. The circuit 100 can be included in a device under test (DUT) and can be coupled between input ports of the DUT and logic of the DUT.

It is noted that the circuit 100 can be used in various other application areas where it is desired to align the input signals and generate aligned signals. The circuit 100 can be external to a device that requires the aligned signals or can be embedded in the device that requires the aligned signals. The aligned signals can be defined as signals with minimal or no misalignment.

In one example, the DUT can be placed on an automated testing equipment (ATE) board. The circuit 100 can be present in the DUT or can be embedded in the ATE board to provide aligned signals to the logic of the DUT.

The circuit 100 includes a clock generating circuit 105, hereinafter referred to as the clock circuit 105. The clock circuit 105 can include an OR gate 106 and a NOT gate 108 with output terminal of the OR gate 106 being coupled to an input terminal of the NOT gate 108.

It is noted that the clock circuit 105 can be implemented using combination of various other gates.

The circuit 100 also includes a first flip flop 110A, hereinafter referred to as the flip flop 110A, and a second flip flop 110B, hereinafter referred to as the flip flop 110B. Clock input terminals (CLK) of the flip flop 110A and the flip flop 110B are coupled to the output terminal of the OR gate 106. The flip flop 110A and the flip flop 110B can be delay flip flops.

In some embodiments, the circuit 100 includes N such flip flops, for example the flip flop 110A to a flip flop 110N.

The circuit 100 also includes a finite state machine (FSM) 115. The FSM 115 is coupled to the clock circuit 105, the flip flop 110A and the flip flop 110B.

The circuit 100 further includes a first programmable delay element 120A, hereinafter referred to as the delay element 120A, and a second programmable delay element 120B, hereinafter referred to as the delay element 120B. The delay element 120A and the delay element 120B are coupled to the FSM 115.

In some embodiments, the circuit 100 includes N such delay elements, for example the delay element 120A to a delay element 120N.

The circuit 100 can also include other delay elements, for example a delay element 125A to a delay element 125N. The other delay elements can be configured manually or can be used to add a finite delay. The other delay elements are hereinafter referred to as finite delay elements. Each such finite delay element is coupled to corresponding delay element. For example, the delay element 125A is coupled to the delay element 120A and the delay element 125N is coupled to the delay element 120N.

The circuit 100 can also include a plurality of gates, for example a first gate 130A, hereinafter referred to as the gate 130A, and a second gate 130B, hereinafter referred to as the gate 130B. The gate 130A has input terminals coupled to the delay element 125A and to the FSM 115. The gate 130B has input terminals coupled to the delay element 125B and to the FSM 115. The circuit 100 also includes a first multiplexer 135A, hereinafter referred to as the multiplexer 135A, and a second multiplexer 135B, hereinafter referred to as the multiplexer 135B. The multiplexer 135A is coupled to the gate 130A and the multiplexer 135B is coupled to the gate 130B.

In some embodiments, the circuit 100 includes N such gates, for example the gate 130A to a gate 130N.

In some embodiments, when the finite delay elements are not present the gates can be coupled to corresponding delay elements. For example, the gate 130A can be coupled to the delay element 120A and the gate 130N can be coupled to the delay element 120N.

Input signals, for example a signal 140A and a signal 140B, can be received at respective input ports of the DUT. The signal 140A and the signal 140B can be misaligned with respect to each other. The working of the circuit 100 to align the input signals is explained as follows.

It is noted that the following description has been explained with respect to two input signals and can be applied for N number of input signals, where N is a natural number greater than 1.

A reset signal (RZ) can be used to reset or clear the flip flop 110A and the flip flop 110B. The OR gate 106 is responsive to a first signal 160A and a second signal 160B to generate a clock signal 145. The first signal 160A is obtained at output of the delay element 120A and is also referred to as a first signal associated with the signal 140A. Similarly, the second signal 160B is obtained at output of the delay element 120B and is also referred to as a second signal associated with the signal 140B. Initially, when the input signals are received for first time then the first signal 160A is similar to the signal 140A and the second signal 160B is similar to the signal 140B. The flip flop 110A is responsive to a first type of edge, for example a positive edge, of the clock signal 145 to output the first signal 160A to the FSM 115. Similarly, the flip flop 110B is responsive to the first type of edge of the clock signal 145 to output the second signal 160B to the FSM 115.

The FSM 115 receives inverted version of the clock signal 145. The inverted version of the clock provided to the FSM is hereinafter referred to as an FSM clock. The FSM 115 is responsive to a second type of edge, for example a negative edge, of the clock signal 145 to process and detect early arrival of one of the first signal 160A and the second signal 160B with respect to each other. The FSM 115 then generates control signals based on detection. For example, if early arrival of the first signal 160A is detected as compared to the second signal 160B, then the FSM 115 generates a first control signal 150A, hereinafter referred to as the control signal 150A, with at least one non zero bit. The control signal 150A is indicative of delay to be added to the signal 140A if early arrival of the first signal 160A is detected. The control signal 150A can be a combination of one or more bits. All zero bits in a control signal indicate no delay. Non-zero bits in the control signal are indicative of the delay.

Similarly, the FSM 115 generates a second control signal 150B, hereinafter referred to as the control signal 150B, based on the detection. If early arrival of the second signal 160B is detected as compared to the first signal 160A, then the control signal 150B has at least one non zero bit. The control signal 150B is indicative of delay to be added to the signal 140B if early arrival of the second signal 160B is detected.

The delay element 120A delays the signal 140A based on the control signal 150A, if early arrival of the first signal 160A is detected. If early arrival of the second signal 160B is detected, the delay element 120B delays the signal 140B based on the control signal 150B.

In some embodiments, a fixed delay ($D_1$) can also be added to the first signal 160A by using the delay element 125A. A delayed signal thus obtained can be referred to as the signal 160A. The fixed delay ($D_1$) can be added to the first signal 160A when the delay added to the signal 140A is not sufficient to align the first signal 160A with the second signal 160B. The first signal 160A can then be outputted as an output signal 155A, hereinafter referred to as the signal 155A. Similarly, another fixed delay ($D_2$) can be added to the second signal 160B, using the delay element 125B, when the delay added to the signal 140B is not sufficient to align the second signal 160B with the first signal 160A. A delayed signal thus obtained can be referred to as the signal 160B. The second signal 160B can then be outputted as an output signal 155B, hereinafter referred to as the signal 155A.

The gate 130A can output the signal 155A in response to an enable signal (EN). The enable signal is generated by the FSM 115 when the input signals are aligned or when each signal of the input signals has been delayed at least once. Similarly, the gate 130B outputs the signal 155B in response to the enable signal.

A delay flag, present in the FSM 115, can be associated with each input signal and is indicative of whether each signal of the input signals has been delayed at least once. For example, one delay flag can be associated with the signal 140A and another delay flag can be associated with the signal 140B. If the delay flag associated with the signal 140A is LOW then the signal 140A is considered as not delayed. Similarly, if the delay flag associated with the signal 140B is LOW then the signal 140B is considered as not delayed. If all the delay flags are asserted HIGH then the input signals are considered to be aligned. The delay flags can be maintained using counters as explained in conjunction with FIG. 3.

The input signals can be aligned in one or more clock cycles. A clock cycle, generated from the clock circuit 105, can be defined as a period required to determine if the input signals are aligned or misaligned. The alignment can happen in any clock cycle.

The FSM 115 also generates a run signal (RN) when the FSM 115 starts operating. The run signal indicates that alignment of the input signals has started. The run signal is asserted HIGH when any of the input signals arrive early.

The multiplexer 135A can be used to select one of the first signal 160A or the signal 140A as the output signal 155A. Similarly, the multiplexer 135B can be used to select one of the second signal 160B or the signal 140B as the output signal 155B. A bypass signal (BP) can be used to selectively output the input signals as output signals using multiplexers. The multiplexer 135A can be used to selectively output the signal 140A as the output signal 155A, if there is no delay added to the signal 140A. Similarly, the multiplexer 135B can be used to selectively output the signal 140B as the output signal 155B, if there is no delay added to the signal 140B.

Figure 2:
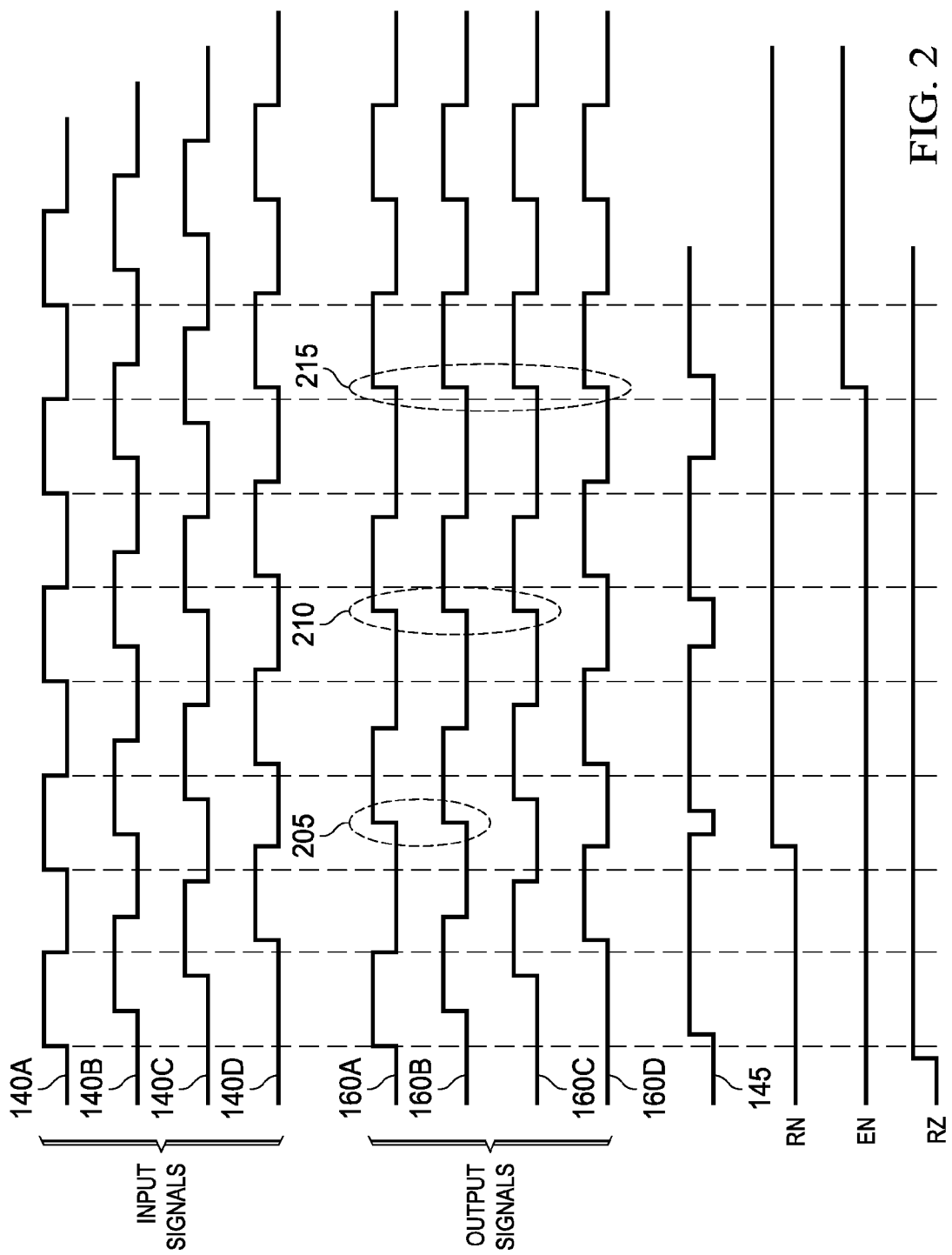
FIG. 2 is a timing diagram illustrating alignment of input signals, in accordance with one embodiment.

FIG. 2 is a timing diagram illustrating alignment of the input signals, for example the signal 140A, the signal 140B, a third signal 140C, hereinafter referred to as the signal 140C, and a fourth signal 140D, hereinafter referred to as the signal 140D. The reset signal (RZ) is asserted HIGH in order to reset the flip flops associated with the input signals. For example, the reset signal resets the flip flop 110A associated with the signal 140A.

In illustrated example, initially, the signal 140A is at logic level HIGH and hence the first signal 160A is sampled HIGH. Also, the signal 140B, the signal 140C, and the signal 140D are at logic level LOW and hence the second signal 160B, a third signal 160C, and a fourth signal 160D, are sampled LOW. Since the first signal 160A is sampled HIGH, the clock signal 145 is also at logic level HIGH indicating sampling of at least one signal, for example the first signal 160A as HIGH. A flip flop, for example the flip flop 110A, that samples the first signal 160A as HIGH then outputs logic 1 of the first signal 160A to an FSM, for example the FSM 115. Similarly, the second signal 160B, the third signal 160C, and the fourth signal 160D, outputs logic 0 to the FSM 115.

The FSM 115 detects early arrival of the signal 140A with respect to the signal 140B, the signal 140C, and the signal 140D. The run signal (RN) is asserted HIGH as the FSM 115 starts operation. A first delay flag can be associated with the signal 140A, a second delay flag can be associated with the signal 140B, a third delay flag can be associated with the signal 140C, and a fourth delay flag can be associated with the signal 140D. Initially, the first delay flag, the second delay flag, the third delay flag, and the fourth delay flag are LOW. Since the signal 140A arrives early and needs to be delayed after the first clock cycle, the first delay flag is asserted HIGH and other delay flags remain LOW. The FSM 115 then generates a plurality of control signals corresponding to the input signals. For example, the control signal 150A is generated for the signal 140A and the control signal 150B is generated for the signal 140B. As the first signal 160A is sampled HIGH, the control signal 150A has at least one non-zero bit indicating the delay to be added to the signal 140A. Other control signals, for example the control signal 150B, a third control signal 150C, hereinafter referred to as the control signal 150C, and a fourth control signal 150D, hereinafter referred to as the control signal 150D, are generated without any change in the bits. The delay element 120A then delays the signal 140A, which initially is similar to the first signal 160A before addition of the delay. The first signal 160A is hence aligned with the second signal 160B at an instant 205. The first signal 160A and the second signal 160B can be aligned in one or more clock cycles that are generated from the circuit 105. The alignment can happen in any clock cycle. As illustrated in FIG. 2, the first signal 160A and the second signal 160B are aligned in a second clock cycle.

After the second clock cycle, the FSM 115 now detects that the first signal 160A and the second signal 160B are sampled HIGH due to early arrival as compared to the third signal 160C and the fourth signal 160D. Since the signal 140A and the signal 140B needs to be delayed, the first delay flag and the second delay flag are asserted HIGH. The FSM 115 then generates the control signals for the input signals. The bits in the control signal 150A and the control signal 150B are incremented in order to delay the signal 140A and the signal 140B. At instant 210, the first signal 160A and the second signal 160B are then aligned with respect to the third signal 160C. The alignment can be performed in one or more cycles. As illustrated, the first signal 160A, the second signal 160B, and the third signal 160C are aligned in a third clock cycle. The FSM 115 now detects early arrival of the first signal 160A, the second signal 160B, and the third signal 160C as compared to the fourth signal 160D. Since the signal 140A, the signal 140B, and the signal 140C needs to be delayed, the first delay flag, the second delay flag, and the third delay flag are asserted HIGH. The FSM 115 then generates the control signals to delay the signal 140A, the signal 140B, and the signal 140C, by incrementing the bits in respective control signals. The first signal 160A, the second signal 160B, and the third signal 160C are then aligned with respect to the fourth signal 160D at instant 215. As illustrated, the first signal 160A, the second signal 160B, the third signal 160C, and the fourth signal 160D are aligned in a fourth clock cycle. The fourth delay flag is also asserted HIGH at end of the fourth clock cycle as the input signals are now aligned with each other. When the input signals are aligned with respect to each other, the enable signal (EN) is asserted HIGH.

Figure 3:
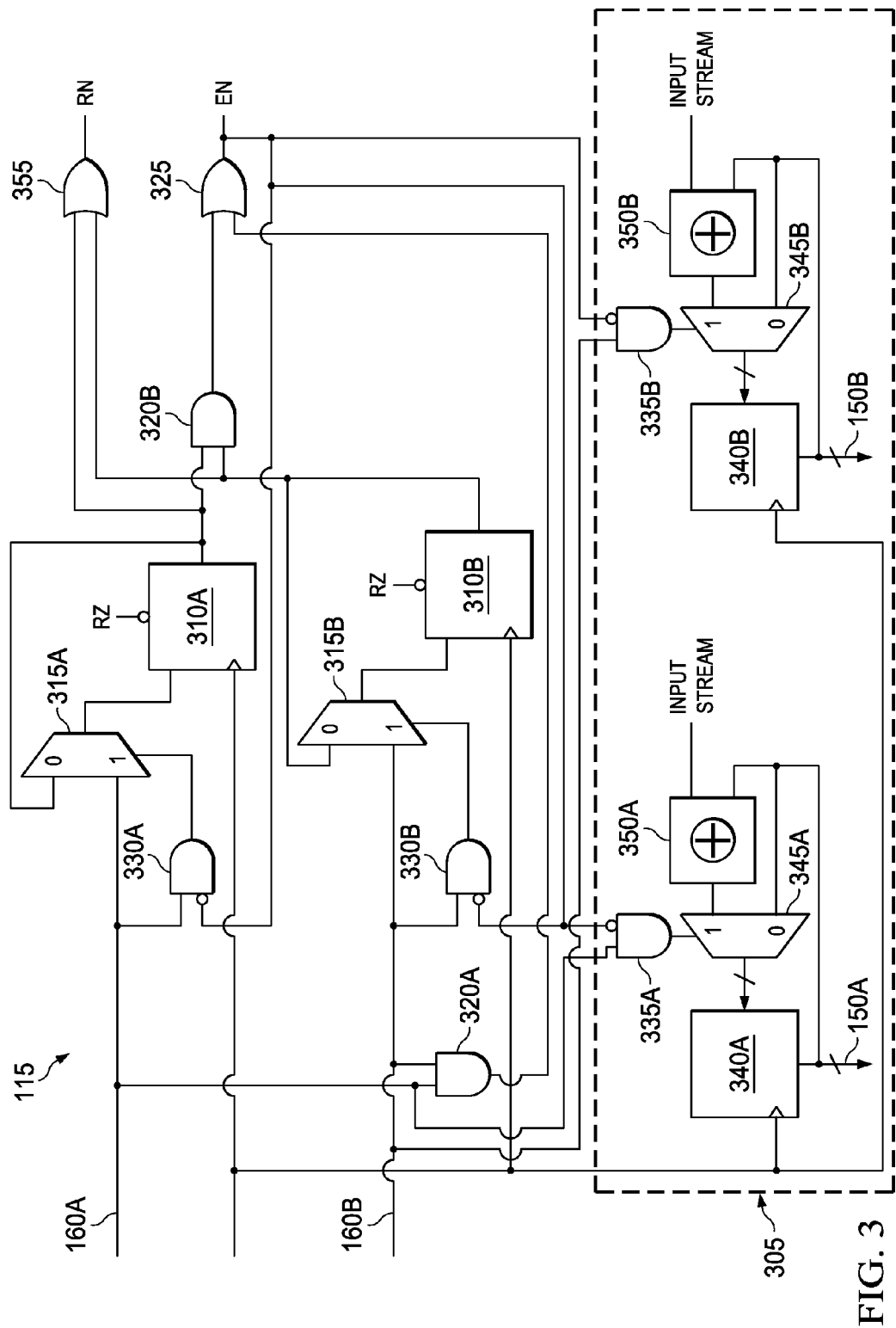
FIG. 3 illustrates a finite state machine, in accordance with one embodiment.

Referring now to FIG. 3, the FSM 115 includes a set of registers, a decision unit, and a generating unit 305.

The set of registers include a first register 310A, hereinafter referred to as the register 310A, and a second register 310B, hereinafter referred to as the register 310B. The register 310A and the register 310B are delay flip flops. A third multiplexer 315A, hereinafter referred to as the multiplexer 315A, is coupled to the register 310A and has one input terminal that receives the first signal 160A. A fourth multiplexer 315B, hereinafter referred to as the multiplexer 315B, is coupled to the register 310B and has one input terminal that receives the second signal 160B.

The decision unit includes a first AND gate 320A, hereinafter referred to as the AND gate 320A, a second AND gate 320B, hereinafter referred to as the AND gate 320B, and an OR gate 325. The AND gate 320A has input terminals that receive the first signal 160A and the second signal 160B. The AND gate 320B has one input terminal coupled to the register 310A and to another input terminal of the multiplexer 315A. Another input terminal of the AND gate 320B is coupled to the register 310B and to another input terminal of the multiplexer 315B. The OR gate 325 has input terminals coupled to the AND gate 320A and the AND gate 320B. A third AND gate 330A, hereinafter referred to as the AND gate 330A, is coupled to the multiplexer 315A and has input terminals that receive the first signal 160A and an inverted version of the enable signal (EN). A fourth AND gate 330B, hereinafter referred to as the AND gate 330B, is coupled to the multiplexer 315B and has input terminals that receive the second signal 160B and an inverted version of the enable signal (EN).

The generating unit 305 includes a fifth AND gate 335A, hereinafter referred to as the AND gate 335A, a counter 340A, a fifth multiplexer 345A, hereinafter referred to as the multiplexer 345A, and an incrementer 350A. The AND gate 335A has input terminals that receive the first signal 160A and an inverted version of the enable signal (EN). The counter 340A can include the delay flag associated with the signal 140A. The incrementer 350A is coupled between one input terminal of the multiplexer 345A and the control signal 150A from the counter 340A. The multiplexer 345A is coupled to the AND gate 335A and the counter 340A, and has another input terminal that receives the control signal 150A. The generating unit 305 also includes a sixth AND gate 335B, hereinafter referred to as the AND gate 335B, a counter 340B, a sixth multiplexer 345B, hereinafter referred to as the multiplexer 345B, and an incrementer 350B. The AND gate 335B has input terminals that receive the second signal 160B and an inverted version of the enable signal (EN). The counter 340B can include the delay flag associated with the signal 140B. The incrementer 350B is coupled between one input terminal of the multiplexer 345B and the control signal 150B from the counter 340B. The multiplexer 345B is coupled to the AND gate 335B and the counter 340B, and has another input terminal that receives the control signal 150B.

In some embodiments, the decision unit includes another gate, for example an OR gate 355, having input terminals coupled to the register 310A and the register 310B.

The register 310A and the register 310B are reset using the reset signal (RZ). If the first signal 160A arrives earlier than the second signal 160B, the first signal 160A is at logic 1 as compared to logic 0 of the second signal 160B. As the enable signal (EN) is at logic 0, the AND gate 330A outputs a logic 1. The multiplexer 315A hence selects the first signal 160A and logic 1 of the first signal 160A is reflected at input of the register 310A. At a positive edge of the FSM clock, the register 310A outputs logic 1. Similarly, the AND gate 330B outputs a logic 0. The multiplexer 315B hence selects an output of the register 310B that is stored previously. Logic 0 is received at input of the register 310B which is output at a positive edge of the FSM clock. The AND gate 320B performs a logical AND operation of the first signal 160A at logic 1 and the enable signal at logic 0 to provide a logic 0 to the OR gate 325. The AND gate 320A performs a logical AND operation of the first signal 160A and the second signal 160B to provide a logic 0 to the OR gate 325. The OR gate 325 hence generates EN=0 which indicates that the first signal 160A and the second signal 160B are not aligned with respect to each other. Hence the early arriving signal, the first signal 160A, needs to be delayed using the control signal 150A generated by the generation unit 305. The AND gate 335A generates a logic 1 based on values of the enable signal and the first signal 160A. The multiplexer 345A then outputs value of the incrementer 350A to the counter 340A. The incrementer 350A generates the value by adding a binary 1 to an input stream. The input stream can be a combination of one or more bits. The counter 340A can assert the delay flag associated with the signal 140A as HIGH and further outputs the control signal 150A at a positive edge of the FSM clock in order to delay the signal 140A. The control signal 150B does not add any delay to the delay element 120B as the AND gate 335B outputs a logic 0.

The delay element 120A adds the delay to the signal 140A and the FSM 115 again detects if the first signal 160A is aligned with respect to the second signal 160B. If the signals are aligned or if delay has been added, the enable signal is asserted HIGH and EN=1.

In some embodiments, the OR gate 355 generates a run signal (RN) to indicate that the FSM 115 is in operation. The run signal is asserted HIGH and RN=1 when either the first signal 160A or the second signal 160B is sampled HIGH.

Figure 4:
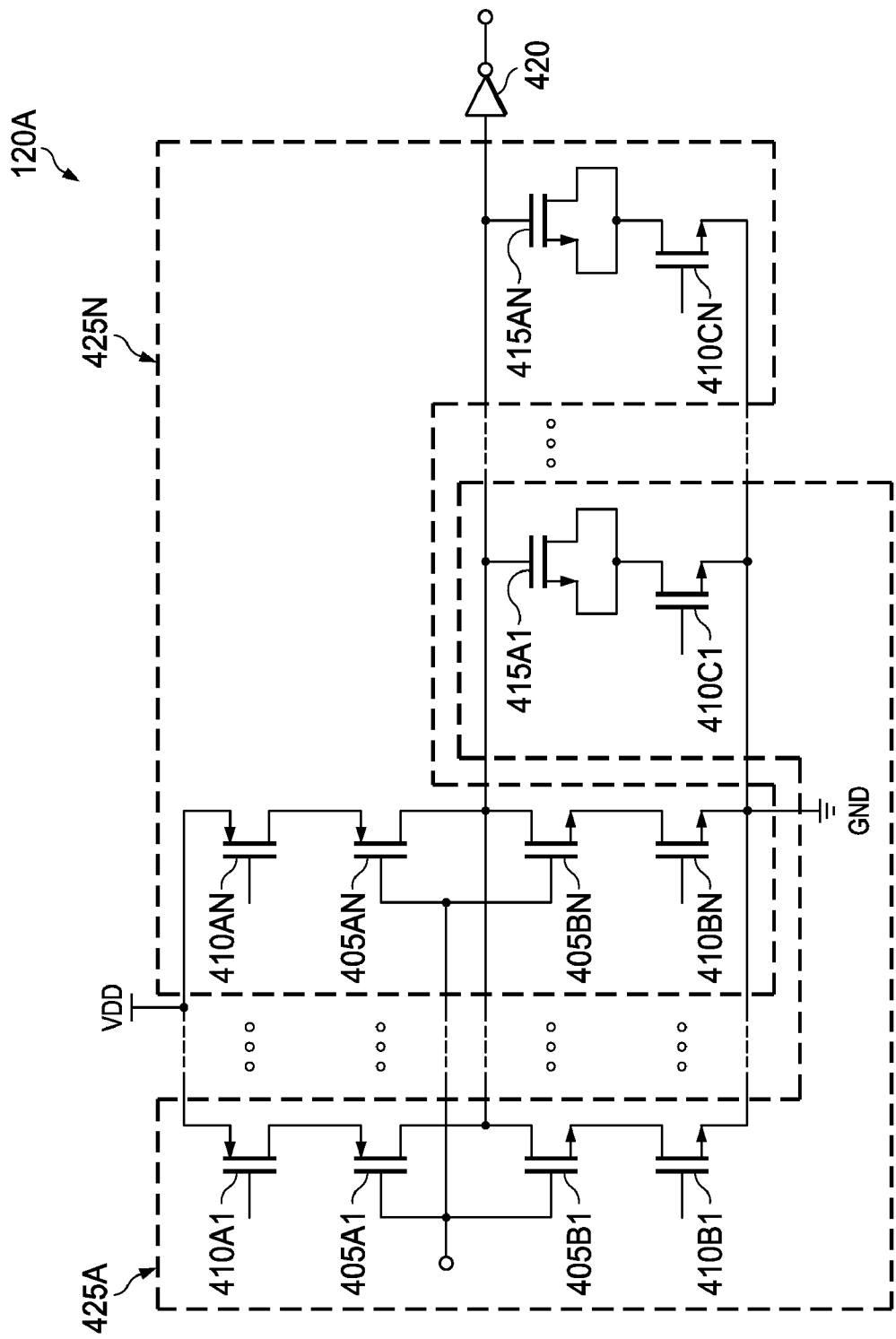
FIG. 4 illustrates a programmable delay element, in accordance with one embodiment.

FIG. 4 illustrates a programmable delay element, for example the delay element 120A. The delay element 120A includes one or more delay units, for example a delay unit 425A to a delay unit 425N. The delay unit 425A includes a first transistor $405A_1$, hereinafter referred to as the transistor $405A_1$, a second transistor $405B_1$, hereinafter referred to as the transistor $405B_1$, a first switch $410A_1$, hereinafter referred to as the switch $410A_1$, a second switch $410B_1$, hereinafter referred to as the switch $410B_1$, a third switch $410C_1$, hereinafter referred to as the switch $410C_1$, and a load $415A_1$. The transistor $405A_1$ has a drain coupled to a drain of the transistor $405B_1$. The transistor $405B_1$ has a gate coupled to a gate of the transistor $405A_1$. The switch $410A_1$ has a source coupled to a power supply (VDD) and a drain coupled to a source of the transistor $405A_1$. The switch $410B_1$ has a source coupled to a ground supply (GND) and a drain coupled to a source of the transistor $405B_1$. The switch $410A_1$ and the switch $410B_1$ have gates that receive the control signal 150A. The load $415A_1$ has a gate coupled to the drain of the transistor $405A_1$ and to the drain of the transistor $405B_1$, and a source coupled to a drain of the load $415A_1$. The load $415A_1$ includes a transistor. The switch $410C_1$ has a drain coupled to the source and the drain of the load $415A_1$, a source coupled to the ground supply (GND), and a gate that receives the control signal 150A. The delay element 120A further includes an inverter 420 having one terminal coupled to the gate of the load $415A_1$.

The transistor $405A_1$ and the transistor $405B_1$ together invert the signal 140A. The switch $410A_1$, the switch $410B_1$, and the switch $410C_1$ are responsive to the control signal 150A that corresponds to the delay element 120A. The switch 410A1 controls the transistor 405A1, the switch 410B1 controls the transistor 405B1, and the switch 410C1 controls the load 415A1, to delay the signal 140A corresponding to the delay element 120A. The load 415A1 acts as a capacitor and stores the signal 140A which is inverted. The load 415A1 also increases delay range of the delay element 120A to align the signal 140A with other input signals. The inverter 420 inverts the signal 140A before outputting.

In some embodiments, the delay element 120A includes N such transistors, N such switches, and N such loads. For example, from the transistor 405A1 to a transistor 405AN, from the transistor 405B1 to a transistor 405BN, from the switch 410A1 to a switch 410AN, from the switch 410B1 to a switch 410BN, from the switch 410C1 to a switch 410CN, from the load 415A1 to a load 415AN.

Structure and functioning of other delay units are similar to that of the delay unit 425A.

In some embodiments, the transistor 405A1 and the transistor 405B1 together constitute a complementary metal oxide semiconductor (CMOS) inverter. The transistor 405A1 and the switch 410A1 can be positive metal oxide semiconductor (PMOS) type transistors. The transistor 405B1, the switch 410B1, the load 415A1, and the switch 410C1 can be negative metal oxide semiconductor (NMOS) type transistors.

It is noted that various other implementations of the delay element 120A can be used for generating delay.

Figure 5:
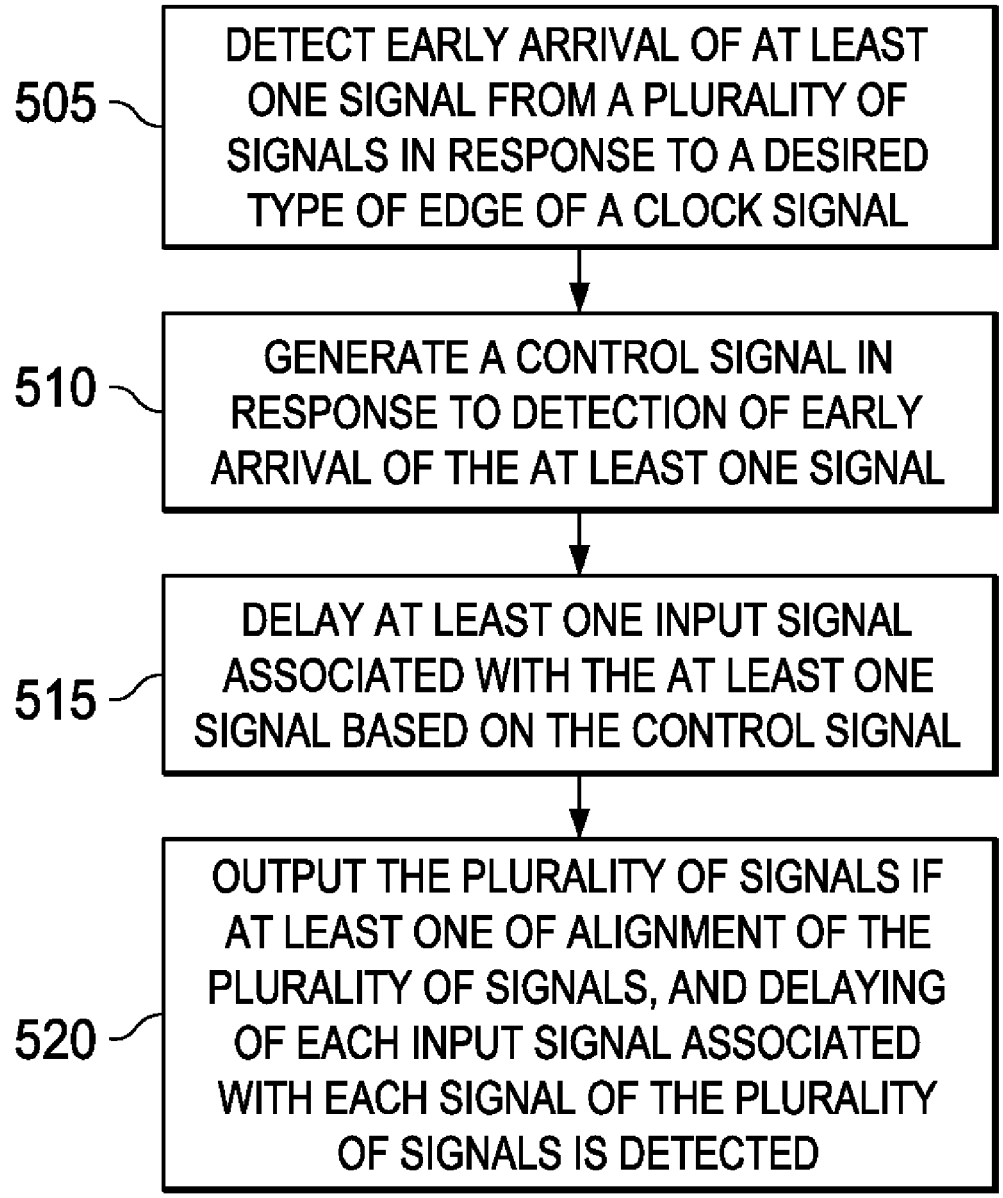
FIG. 5 is a flow diagram illustrating a method for aligning input signals, in accordance with one embodiment.

FIG. 5 is a flow diagram illustrating a method for aligning input signals. The aligning can be performed using an aligning circuit, for example the circuit 100. The circuit 100 can be coupled between input ports of a device under test (DUT) and a logic of the DUT.

At step 505, early arrival of at least one signal from a plurality of signals or the input signals is detected in response to a desired type of edge, for example a negative edge, of a clock signal, for example the clock signal 145. The early arrival of the at least one signal is detected by sampling the signals using flip flops, for example the flip flop 110A to the flip flop 110N. One or more signals that are sampled HIGH are then detected as early arriving signals and can be referred to as the at least one signal. The detection can be performed by a finite state machine (FSM), for example the FSM 115. The early arrival of the at least one signal indicates that the signals are misaligned with respect to each other.

The clock signal can be generated by performing a logical OR operation of the signals using a clock generating circuit, for example a clock circuit 105.

At step 510, a control signal is generated in response to detection of early arrival of the at least one signal. In one example, if the first signal 160A arrives early, the control signal 150A is generated by the FSM 115 to delay the signal 140A. The control signal can be a combination of one or more control signals. One control signal can be generated corresponding to one input signal and can be used to delay respective input signal. Each control signal indicates the delay that needs to be added to respective input signal. In case no delay is to be added to an input signal, then the control signal corresponding to that input signal has all zero bits.

At step 515, at least one input signal associated with the at least one signal is delayed based on the control signal. Several input signals can be delayed based on their respective control signals. The at least one input signal can be delayed using a programmable delay element, for example the delay element 120A.

In some embodiments, a delay flag associated with the at least one input signal is asserted HIGH after delaying the at least one input signal. One or more input signals are considered to be aligned if delay flags associated with the input signals are asserted HIGH.

In some embodiments, a fixed delay can be added to further delay the at least one signal.

At step 520, the signals are outputted if alignment of the signals is detected or if each input signal, associated with each signal of the signals, being delayed is detected. Once the signals are delayed, there can still be minimal misalignment with respect to other signals. In such a case, condition of alignment of the signals is not satisfied and the signals can only be outputted if condition of addition of the delay has been detected in each signal. In one embodiment, a logical AND operation of the signals can be performed to detect alignment of the signals. In another embodiment, a logical AND operation of outputs of a set of registers can be performed to detect delaying of each input signal associated with each signal of the signals. One register of the set of registers corresponds to one signal of the signals and enables detection of early arrival of one of the first signal and the second signal.

By using the aligning circuit, misaligned input signals received at the input ports of the DUT can be aligned before transmission to the logic of the DUT. Since the delay is added automatically by the aligning circuit, manual correction can be eliminated. Also, since the aligning circuit can be placed just before the logic of the DUT it can be ensured that minimal misalignment is present in signals received by the logic.

In the foregoing discussion, the term "coupled" refers to either a direct electrical connection between the devices connected or an indirect connection through one or more passive or active intermediary devices. The term "circuit" means at least either a single component or a multiplicity of components, that are connected together to provide a desired function. The term "signal" means at least one current, voltage, charge, data, or other signal.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A circuit for aligning input signals, the circuit comprising:
    a clock generating circuit that is responsive to a first signal and a second signal to generate a clock signal, the first signal is associated with a first input signal of the input signals and the second signal is associated with a second input signal of the input signals;
    a first flip flop, coupled to the clock generating circuit, that is responsive to a first type of edge of the clock signal to output the first signal;
    a second flip flop, coupled to the clock generating circuit, that is responsive to the first type of edge of the clock signal to output the second signal;
    a finite state machine (FSM) that is coupled to the clock generating circuit, the first flip flop and the second flip flop, and that is responsive to a second type of edge of the clock signal to detect early arrival of one of the first signal and the second signal with respect to each other, and generate a first control signal that is indicative of delay to be added to the first input signal if early arrival of the first signal is detected and a second control signal that is indicative of delay to be added to the second input signal if early arrival of the second signal is detected;
    a first programmable delay element coupled to the FSM to delay the first input signal, based on the first control signal, if early arrival of the first signal is detected; and
    a second programmable delay element coupled to the FSM to delay the second input signal, based on the second control signal, if early arrival of the second signal is detected.

2. The circuit as claimed in claim 1, wherein the circuit is coupled between input ports of a device under test (DUT) and logic of the DUT.

3. The circuit as claimed in claim 1, wherein
    the first signal associated with the first input signal is obtained at output of the first programmable delay element, and
    the second signal associated with the second input signal is obtained at output of the second programmable delay element.

4. The circuit as claimed in claim 1, wherein the FSM comprises:
    a set of registers to enable detection of early arrival of one of the first signal and the second signal; and
    a decision unit coupled to the set of registers to detect at least one of aligning of the first signal and the second signal, and delaying of the first input signal and the second input signal, and generate an enable signal in response to detection.

5. The circuit as claimed in claim 4 and further comprising:
a first gate having input terminals coupled to the first programmable delay element and the FSM to output the first signal in response to the enable signal; and
a second gate having input terminals coupled to the second programmable delay element and the FSM to output the second signal in response to the enable signal.

6. The circuit as claimed in claim 4, wherein the decision unit comprises:
a first AND gate responsive to the first signal and the second signal to generate logic 0 if one of the first signal and the second signal arrives early else to generate logic 1;
a second AND gate coupled to the set of registers to generate logic 1 if addition of delay is performed for the first signal and the second signal else to generate logic 0; and
an OR gate coupled to the first AND gate and to the second AND gate to generate the enable signal when at least one of the first AND gate and the second AND gate generates logic 1.

7. The circuit as claimed in claim 6 and further comprising:
a generating unit to generate the first control signal and the second control signal based on the early arrival of one of the first signal and the second signal, and based on an output of the decision unit.

8. The circuit as claimed in claim 7, wherein the generating unit comprises:
a set of counters to assert a first delay flag and a second delay flag as HIGH, the first delay flag associated with the first input signal and the second delay flag associated with the second input signal, and generate the first control signal and the second control signal.

9. The circuit as claimed in claim 1, wherein each programmable delay element comprises:
one or more delay units, each delay unit of the one or more delay units comprising:
a first transistor;
a second transistor having a gate coupled to a gate of the first transistor and having a drain coupled to a drain of the first transistor;
a first switch coupled between a source of the first transistor and a power supply;
a second switch coupled between a source of the second transistor and a ground supply;
a load coupled to the drain of the first transistor and to the drain of the second transistor; and
a third switch coupled between the load and the ground supply,
the first switch, the second switch and the third switch being responsive to a control signal corresponding to the each programmable delay element to control the first transistor, the second transistor and the load, respectively, to delay a signal corresponding to the each programmable delay element.

10. The circuit as claimed in claim 9, wherein each programmable delay element further comprises an inverter that inverts the signal corresponding to the each programmable delay element before outputting.

11. The circuit as claimed in claim 9, wherein the first transistor and the first switch are positive metal oxide semiconductor (PMOS) type transistors; and the second transistor, the second switch, the third switch, and the load are negative metal oxide semiconductor (NMOS) type transistors.

12. The circuit as claimed in claim 1, wherein delaying of one of the first input signal by the first programmable delay element and the second input signal by the second programmable delay element aligns the first signal and the second signal.

13. A circuit comprising:
a clock generating circuit to generate a clock signal based on a plurality of signals;
a plurality of flip flops coupled to the clock generating circuit to output the plurality of signals at a first type of edge of the clock signal, one flip flop of the plurality of flip flops corresponding to one signal of the plurality of signals;
a finite state machine (FSM) coupled to the clock generating circuit and the plurality of flip flops, and responsive to a second type of edge of the clock signal to detect at least one early arriving signal from the plurality of signals and to generate a control signal based on detection; and
a plurality of programmable delay elements coupled to the FSM, at least one programmable delay element of the plurality of programmable delay elements being responsive to the control signal to delay at least one input signal associated with the at least one early arriving signal, wherein one programmable delay element corresponds to one signal of the plurality of signals and the at least one programmable delay element corresponds to the at least one early arriving signal.

14. A method comprising:
detecting early arrival of at least one signal from a plurality of signals in response to a desired type of edge of a clock signal;
generating a control signal in response to detection of early arrival of the at least one signal;
delaying at least one input signal associated with the at least one signal based on the control signal; and
outputting the plurality of signals if at least one of: alignment of the plurality of signals, and delaying of each input signal associated with each signal of the plurality of signals, is detected.

15. The method as claimed in claim 14, wherein delaying of the each input signal comprises asserting a delay flag associated with the each input signal as HIGH.

16. The method as claimed in claim 14, wherein the method is performed by an aligning circuit coupled between input ports of a device under test (DUT) and a logic of the DUT.

17. The method as claimed in claim 14 and further comprising
generating the clock signal based on the plurality of signals by performing a logical OR operation of the plurality of signals.

18. The method as claimed in claim 14, wherein detecting early arrival of the at least one signal comprises
sampling the plurality of signals; and
detecting one or more signals that are sampled HIGH from the plurality of signals as the at least one signal.

19. The method as claimed in claim 14, wherein outputting the plurality of signals comprises:
performing a logical AND operation of the plurality of signals to detect alignment of the plurality of signals; and
performing a logical AND operation of outputs of a set of registers to detect delaying of each input signal associated with each signal of the plurality of signals, one register of the set of registers corresponding to one signal of the plurality of signals and indicative of addition of delay to one input signal associated with the one signal.

* * * * *